Patented May 26, 1936

2,041,854

UNITED STATES PATENT OFFICE 2,041,854

PRESERVATION OF RUBBER

Arthur Morrill Neal, Wilmington, Del., assignor to E. I. du Pont de Nemours & Company, Wilmington, Del., a corporation of Delaware No Drawing. Application February 26, 1932, Serial No. 595,430

10 Claims. (Cl. 18—50)

This invention relates to the preservation of rubber and more particularly to rubber containing compounds which retard the deterioration thereof due to the action of heat and air.

It is well known that rubber normally undergoes deterioration when exposed to the action of light, heat and air. Many materials have been proposed for addition to rubber either in the mixing thereof before vulcanization or by application to the surface thereof after vulcanization, for the purpose of retarding or inhibiting the objectionable effects of light, heat and air. Among such compounds which have been successfully used for this purpose are organic nitrogen compounds such as the amines and more particularly the secondary aromatic amines such as phenyl-beta-naphthylamine and the amino substituted aromatic amines, such as p-amino-phenyl-beta-naphthylamine and p-amino-diphenylamine.

This invention has as an object the provision of a rubber compound having superior age-resisting properties. A further object is to provide a new class of compounds to be added to rubber for increasing its age-resisting properties. A still further object is to provide a process for producing rubber having improved age-resisting properties. Other and further objects are to provide a new composition of matter and to advance the art. Other objects will appear hereinafter.

The above and other objects are accomplished by the following invention which comprises incorporating with rubber before or after vulcanization thereof, certain aromatic diamines which have superior deterioration inhibiting properties to those of prior known substances heretofore used for this purpose.

The compounds which are to be added to rubber in accordance with my invention constitute a class having the general type formula:

in which R represents an organic group comprising an aryl nucleus which may be substituted; $R_1$ represents a phenyl group; and A represents a secondary amino group. By the term secondary amino group, I mean to include groups containing nitrogen joined directly to $R_1$ and in which the nitrogen forms part of a heterocyclic ring such as morpholyl and piperidyl or in which two alkyl radicals such as methyl, ethyl, butyl and the like are carried by the nitrogen atom. When R is a substituted aryl group, the substituted group or groups consist of at least one of the members of the group consisting of oxygen and alkyl, alkoxy, hydroxy and amino groups. Some of the members of this class which have been found to be particularly effective are as follows:

p-morpholyl-phenyl-beta-naphthylamine

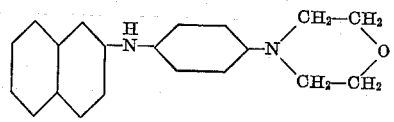

p-morpholyl-phenyl-alpha-naphthylamine

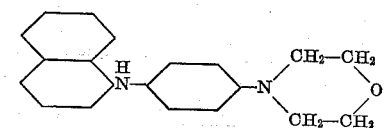

p-dimethylamino-phenyl-beta-naphthylamine

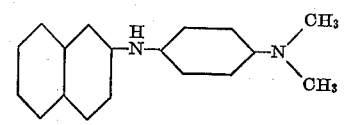

p-(OH)-p'-morpholyl-diphenylamine

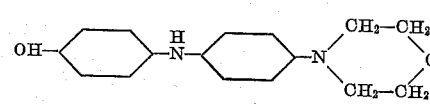

and the indophenol from p-amino-phenyl-morpholine and phenol

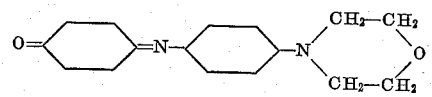

The p-dimethylamino-phenyl-beta naphthylamine and like compounds may be prepared in accordance with the method described in German Patent #73,378 of January 3, 1894, granted to Sandoz & Company. p-(OH)-p'-morpholyl-diphenylamine and the indophenols may be prepared in accordance with the usual methods of preparing leuco indophenols and indophenols such as are described in "Die Schwefel Farbstoffe Ihre Herstellung und Verwendung" by Otto Lange pp. 154–162, published by Otto Spamer, Leipzig, 1912. The preparation and properties of p-morpholyl-phenyl-beta-naphthylamine are described in the copending application of George Clifford Strouse, Serial No. 619,279 filed on or about June 25, 1932. The other morpholyl compounds may be prepared by substantially the same method as employed by Strouse or from amino-phenyl-morpholines according to any of the well known methods of preparing secondary aromatic amines as by reacting the p-aminophenylmorpholine with a hydroxy aromatic compound. A method for preparing p-amino-phenyl-morpholine is described in a copending application of Herbert A. Lubs, Serial No. 616,745, filed on or about June 11, 1932.

In order to illustrate the effectiveness of this class of compounds as deterioration inhibitors for rubber they were incorporated in separate rubber mixes which were all vulcanized to a comparable state of cure. The constituents of these rubber mixes were as follows:

|  | A | B | C | D | E |
|---|---|---|---|---|---|
| Pale crepe | 100 | 100 | 100 | 100 | 100 |
| Zinc oxide | 100 | 100 | 100 | 100 | 100 |
| Lithopone | 20 | 20 | 20 | 20 | 20 |
| Stearic acid | 1 | 1 | 1 | 1 | 1 |
| Sulfur | 3 | 3 | 3 | 3 | 3 |
| Di-ortho-tolyl-guanidine | .75 | .75 | .75 | .75 | .75 |
| p - Morpholyl - phenyl - beta - naphthylamine |  | 1 |  |  |  |
| p-(OH)-p'-morpholyl-diphenylamine |  |  | 1 |  |  |
| Indophenol from p-amino-phenyl-morpholine and phenol |  |  |  | 1 |  |
| p - Dimethyl - amino - phenyl - beta-naphthylamine |  |  |  |  | 1 |

After being vulcanized, slabs of approximately uniform dimensions were cut from the resulting products and were subjected to accelerated ageing tests by hanging such slabs in a Bierer-Davis bomb in which they were subjected to a constant temperature of 70° C. and an oxygen atmosphere at a pressure of 300 pounds per square inch. The results of this test are shown in Table 1:

*Table 1*

| Stock | Original tensile | After 96 hrs. at 70° C. and 300 lbs. O₂—tensile |
|---|---|---|
| A | 2950 | Completely deteriorated in 48 hours. |
| B | 2825 | 2525. |
| C | 3000 | 2500. |
| D | 2950 | 2375. |
| E | 2975 | 2050. |

The sample A, it will be noted, contained no inhibitor. From a comparison of the effect of heat and oxygen on this sample A with the samples containing deterioration inhibiting compounds of my present invention, it will be readily appreciated that this class of compounds has very effective deterioration inhibiting properties.

While, in these examples, I have employed one per cent of the deterioration inhibiting compound based on the rubber, and have incorporated it into the rubber before vulcanization, it is to be understood that the proportions employed may be rather widely varied, and that the deterioration retarder may be added to the rubber after vulcanization by any of the usual methods, such for example as diffusing the inhibitor into the rubber or by treatment of the rubber with a solution of the inhibitor.

Other important compounds of the class defined herein are:

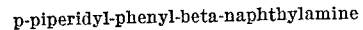

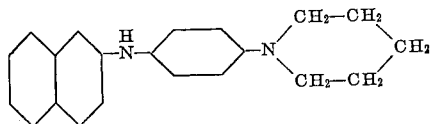

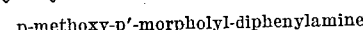

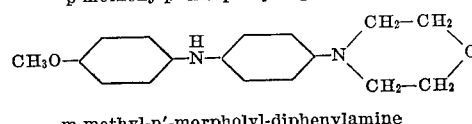

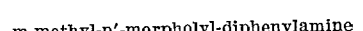

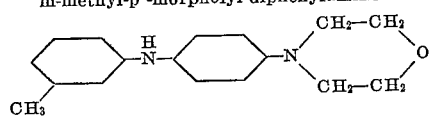

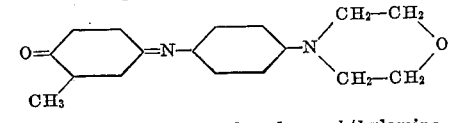

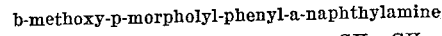

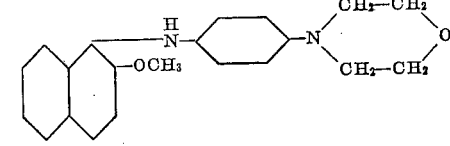

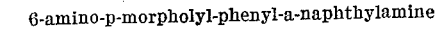

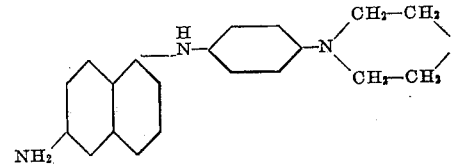

The isomeric forms and homologues of these compounds may also be mentioned. Furthermore, other groups, such as pentamethylene, may be substituted for the morpholyl group.

While I have disclosed certain specific compounds and the use of the same in certain specific proportions, it is to be understood that such disclosure is merely by way of illustration and that various changes and modifications will readily appear to those skilled in the art without departing from the spirit of my invention. Accordingly the scope of my invention is to be limited solely by the appended claims construed as broadly as is permissible in view of the prior art.

I claim:

1. Rubber having incorporated therein as a deterioration inhibitor p-hydroxy-p'-morpholyl-diphenylamine.

2. The process for preserving rubber which comprises incorporating therein p-hydroxy-p'-morpholyl-diphenylamine.

3. The process for preserving rubber which comprises incorporating therein a hydroxy-phenylamino N-phenyl-morpholine.

4. Rubber having incorporated therein as a deterioration inhibitor a hydroxy-phenylamino N-phenyl-morpholine.

5. The process of preserving rubber which comprises incorporating therein a member of the group consisting of hydroxy-phenylamino N-phenyl-morpholines, the indophenol from p-amino-phenyl-morpholine and phenol, the indophenol from p-amino-phenyl-morpholine and o-cresol and methoxy-phenylamino N-phenyl-morpholines.

6. Rubber having incorporated therein as a deterioration inhibitor a member of the group consisting of hydroxy-phenylamino N-phenyl-morpholines, the indophenol from p-amino-phenyl-morpholine and phenol, the indophenol from p-amino-phenyl-morpholine and o-cresol and methoxy-phenylamino N-phenyl-morpholines.

7. The process of preserving rubber which comprises incorporating therein p-methoxy-p'-morpholyl-diphenylamine.

8. The process of preserving rubber which comprises incorporating therein the indophenol from p-amino-phenyl-morpholine and phenol.

9. Rubber having incorporated therein as a deterioration inhibitor p-methoxy-p'-morpholyl-diphenylamine.

10. Rubber having incorporated therein as a deterioration inhibitor the indophenol from p-amino-phenyl-morpholine and phenol.

ARTHUR MORRILL NEAL.